United States Patent [19]

Fukuoka

[11] Patent Number: 5,659,230
[45] Date of Patent: Aug. 19, 1997

[54] BRUSHLESS MOTOR DRIVE CIRCUIT

[75] Inventor: Toshiaki Fukuoka, Yonago, Japan

[73] Assignee: Matsushita Electric Industrial Co., Ltd., Kadoma, Japan

[21] Appl. No.: 316,558

[22] Filed: Sep. 30, 1994

[30] Foreign Application Priority Data

Sep. 30, 1993 [JP] Japan .................................. 5-244546

[51] Int. Cl.$^6$ .................................................. H02K 23/00
[52] U.S. Cl. ....................... 318/254; 318/139; 318/138; 318/632; 318/647; 318/653; 318/678
[58] Field of Search .................................. 318/138, 439, 318/254, 632, 647, 653, 678; 335/68

[56] References Cited

U.S. PATENT DOCUMENTS

| | | |
|---|---|---|
| 3,839,661 | 10/1974 | Wada . |
| 4,030,005 | 6/1977 | Doemen . |
| 4,631,459 | 12/1986 | Fujioka et al. .................... 318/254 |
| 5,134,682 | 7/1992 | Muller ................................ 318/138 X |
| 5,220,257 | 6/1993 | Yoshino et al. .................... 318/254 |
| 5,289,089 | 2/1994 | Aoki .................................... 318/254 |
| 5,349,275 | 9/1994 | Muller ................................ 318/254 |

FOREIGN PATENT DOCUMENTS

| | | |
|---|---|---|
| 48-91513 | 11/1973 | Japan . |
| 50-144022 | 11/1975 | Japan . |
| 4-248394 | 9/1992 | Japan . |
| 6-21396 | 3/1994 | Japan . |

OTHER PUBLICATIONS

Y. Tanaka, "Research on Transistor Synchronous Motor", *Journal of the Institute of Electrical Engineers of Japan*, report No. 39–86, (Nov. 1964).

*Primary Examiner*—Karen Masih
*Attorney, Agent, or Firm*—Ratner & Prestia

[57] ABSTRACT

A brushless motor drive circuit which can suppress switching pulses without using capacitors or other external components is provided. The brushless motor drive circuit has a hall element for generating two sinusoidal signals of opposite phase and a switching circuit which separates the two sinusoidal signals and cuts off the negative portion to produce two half cycle signals. The two half cycle signals are combined in the switching circuit, and the combined signal is applied to an automatic gain control circuit for providing a stable current to the hall element.

13 Claims, 7 Drawing Sheets

BASE INPUT OF TR 18

BASE INPUT OF TR 38

BASE INPUT OF TR 28

BASE INPUT OF TR 32

BASE INPUT OF TR 25

BASE INPUT OF TR14

BRUSHLESS MOTOR DRIVE CIRCUIT

BACKGROUND OF THE INVENTION

1. Field of the Invention

The present invention relates to a brushless motor drive circuit, and particularly to a means for reducing the switching pulse during phase switching.

2. Description of the Prior Art

The good control characteristics of recent compact DC motors have been confirmed in the audio, information processing, and various industrial fields, leading to the rapid development of applications for such motors. Brushless motors in particular have a long service life because they have no contact parts such as brushes and commutators. Industrial applications for brushless motors, for which reliability is a primary consideration, have therefore expanded rapidly.

An example of one such application is the axial-flow fan, the drive method of which has changed in recent years from AC to DC motors. DC axial-flow fans using a brushless motor are now common.

DC axial-flow fans have two design constraints: the drive circuit must be housed in limited space, and the fan must be marketable at a low cost. To meet these constraints, a single magnetic detection element is used for drive, and simple two-phase, half-wave wiring is used. To further simplify the circuitry and improve efficiency, a method whereby the output circuit switches, and the generated switching pulse is suppressed by a capacitor, Zener diode, or other device, is commonly used.

FIG. 7 is a schematic diagram of a brushless motor drive circuit using a capacitor according to the prior art; FIG. 9 is a wave diagram of the output wave from the drive circuit in FIG. 7 and the output circuit in FIG. 8, which is described below.

As shown in FIG. 7, the base of transistor 112 is connected to the output terminal of Hall IC 111; the collector of the transistor 112 is connected to one end of resistance 113, the other end of which is connected to Vcc, and to the anode of diode 114, which is connected in series with diode 115; and the emitter is connected to one end of resistance 116, the other end of which is connected to the GND, and to the base of output transistor 117, the emitter of which is also connected to the GND.

The collector of the output transistor 117 is connected to one side of the capacitor 118, the other end of which is connected to the GND, and to Vcc through the motor drive coil 119.

The emitter of the output transistor 121 is connected to the GND; the base to the cathode side of diode 115, and to one side of resistance 120, the other side of which is connected to the GND; and the collector is connected to Vcc through the motor drive coil 123, and to one side of capacitor 122, the other side of which is connected to the GND.

The output circuit 124 is the area enclosed in the dotted line.

With the drive circuit shown in FIG. 7, however, the output current wave shown in FIG. 9A will become an output voltage wave with a switching pulse (dotted line indicates a virtual induced electromotive force) as shown in FIG. 9B generated during phase switching. This switching pulse generated during phase witching can be reduced by ptimally selecting the capacitance of capacitors 118 and 122, resulting in the switching pulse (dotted line indicates a virtual induced electromotive force) shown in FIG. 9C, but this is not truly satisfactory. More specifically, no benefit is obtained if the capacitance of capacitors 118 and 122 is too low; if the capacitance is increased too much, a time delay occurs as shown in FIG. 9C, leading to problems with switching timing, or current backflow to the power supply caused by an increase in resonant energy with the motor drive coil. A compromise capacitance of several microfarads (1–2 µF) is therefore generally used.

Because it is necessary to place the circuit components in a confined space in DC axial-flow fan motors, it is necessary to reduce the number of external components and increase the use of ICs. There is also a method using Zener diodes in place of capacitors, and thus does not use the two several-microfarad capacitors 118 and 122 shown in FIG. 7.

FIG. 8 is a schematic diagram of another brushless motor drive circuit, an output circuit in which one phase part of the output circuit 124 shown in FIG. 7 is changed. Specifically, the emitter of output transistor 134 is connected to the GND; the collector is connected to Vcc through the motor drive coil 135, and to the cathode side of the Zener diode group 133; and the base is connected through resistor 131 to the GND, and through resistor 132 to the anode side of Zener diode group 133.

While the drive circuit can be easily integrated using this design, this design conversely increases the switching noise (dotted line indicates a virtual induced electromotive force) generated during phase switching as shown in FIG. 9D.

SUMMARY OF THE INVENTION

Therefore, an object of the present invention is to provide a brushless motor drive circuit whereby the switching pulse can be suppressed and switching noise prevented without using external components, and which can be easily achieved in an integrated circuit device.

To achieve this object according to the present invention, a brushless motor drive circuit for driving a brushless motor having a rotor comprises: a magnetic detection circuit comprising a magnetic detection element for detecting a rotational position of the rotor and for producing a plurality position signals in different phases; a switching circuit for separating said position signals, cutting off one of the positive and negative sides of each of the separated position signals to produce half cycle signals, and combining said half cycle signals to produce a combined signal; an automatic gain control circuit for comparing said combined signal with a predetermined reference signal, and feeding back the compared signal to said magnetic detection circuit; a pre-drive circuit for producing said half cycle signals; and an output circuit for producing a drive signal for driving the motor.

By monitoring and combining the output current separated by the switching circuit, and comparing the output current with the reference voltage of the AGC circuit, it is possible to prevent switching pulse generation without using external components; the circuit design is therefore easily adapted to integration; and a compact IC device that can be placed in confined spaces can be achieved.

Because the external components are eliminated, the materials cost of the drive circuit and the number of manufacturing processes required can be reduced, and a low-cost motor can therefore be provided.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
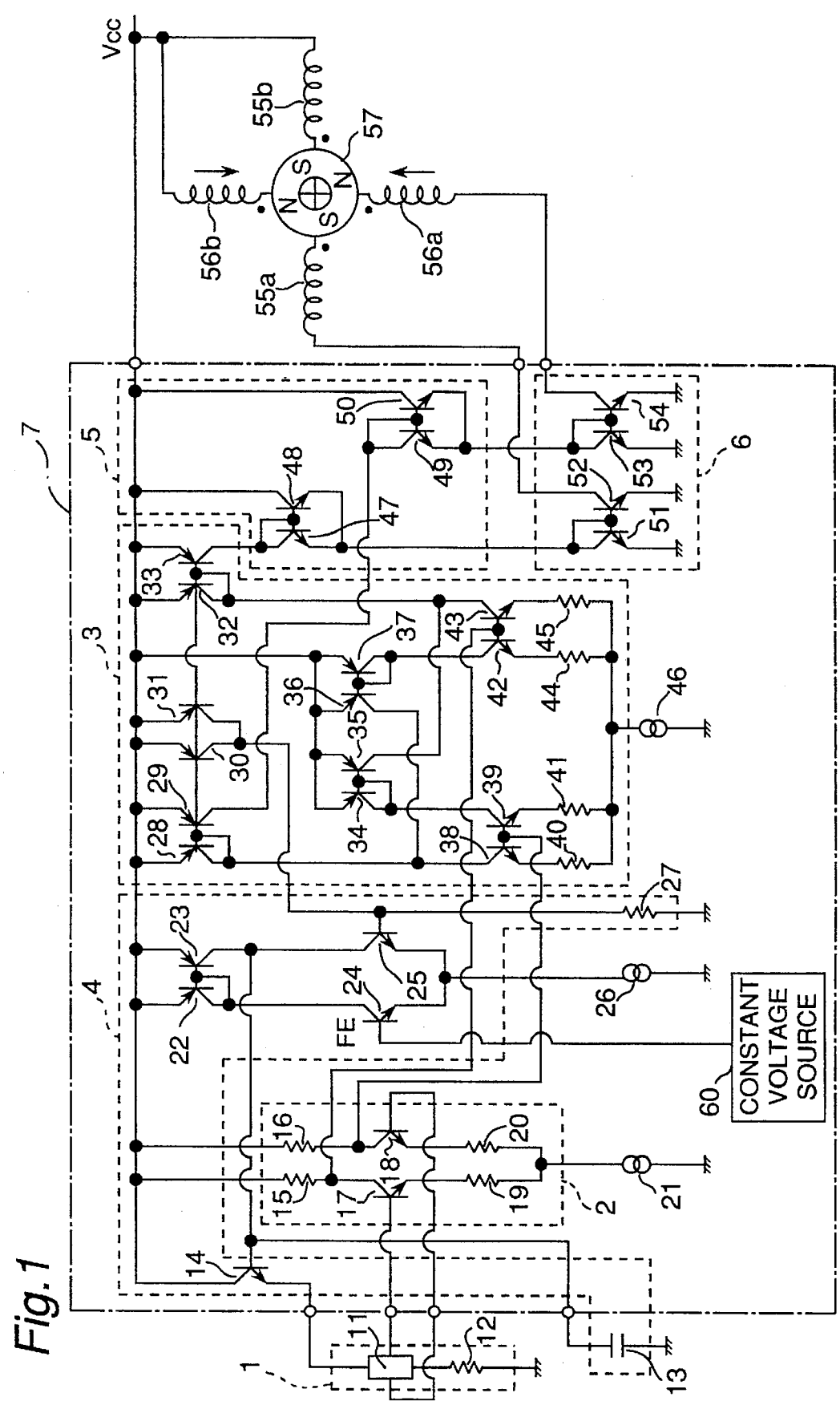
FIG. 1 is a schematic diagram of a brushless motor drive circuit according to the first embodiment of the invention.

The first embodiment of a brushless motor drive circuit according to the invention is described below with reference to FIG. 1, a schematic diagram of the brushless motor drive circuit. As shown in FIG. 1, this brushless motor drive circuit comprises magnetic detection circuit 1, position signal amplifying circuit 2, switching circuit 3, AGC circuit 4, pre-drive circuit 5, output circuit 6, and integrated circuit 7. A detail of the brushless motor is disclosed in a Japanese Report entitled "Research on Transistor Synchronous Motor" Report No 39-86, by Y. Tanaka in Journal of the Institute of Electrical Engineers of Japan, issued November 1964, the entire content of which is expressly incorporated by reference herein.

Figure 3A:
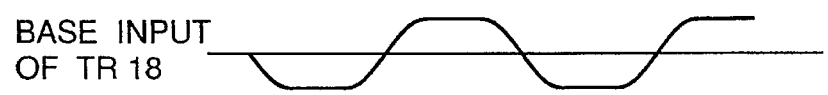
FIGS. 3A, 3B, 3C, 3D, 3E, 3F, 3G and 3H are wave form diagrams of the output voltage wave obtained from the apparatus in FIG. 1.

The magnetic detection circuit 1 comprises a magnetic detection element 11, such as a Hall element, located adjacent a rotor 57 and a resistor 12. In the embodiment shown in FIG. 1, rotor 57 is formed by a doughnut shaped magnet having two N poles and two S poles disposed alternately. Thus, by the rotation of the rotor 57, the magnetic detection element 11 generates sinusoidal signals, one of which is shown in FIG. 3A. The output terminals of the magnetic detection element 11 are connected, respectively, to the bases of transistors 17 and 18, which form a differential amplifier in the position signal amplifying circuit 2. The magnetic detection element 11 detects the movement of the magnets carried in the rotor 57 of the brushless motor and produces two signals having sinusoidal wave form in opposite phase. One output signal which is applied to the base of transistor 18 is shown in FIG. 3A.

Figure 3B:
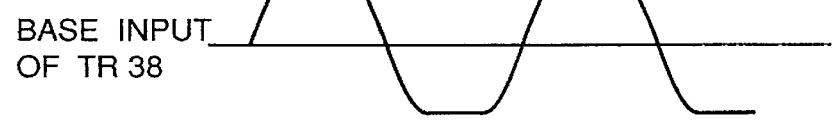

The position signal amplifying circuit 2 comprises transistors 17 and 18, and resistors 15, 16, 19, and 20. The collectors of transistors 17 and 18 are each connected to the base of one of two pairs of transistors in the switching circuit 3. The collector output of transistor 18, which is applied to the base of transistor 38, is shown in FIG. 3B.

The switching circuit 3 comprises two pairs of transistors 38, 39 and 42, 43 forming a differential amplifier; transistors 34, 35 and 36, 37, and 28, 29, 30 and 31, 32, 33 forming current mirror circuits; and resistors 40, 41, and 44, 45.

The output of transistor 39 Of the one transistor pair 38 and 39 passes transistors 34 and 35 forming a third current mirror circuit, and is applied to the collector of transistor 43 so as to counterbalance the negative cycle of the signal produced from the collector of the transistor 43; and the output of transistor 42 of the other transistor pair 42 and 43 passes transistors 36 and 37 forming a fourth current mirror circuit, and is applied to the collector of transistor 38 so as to counterbalance the negative cycle of the signal produced from the collector of the transistor 38. As apparent from the wave forms of FIGS. 3C and 3D, only the positive half cycles are produced.

Figure 3C:
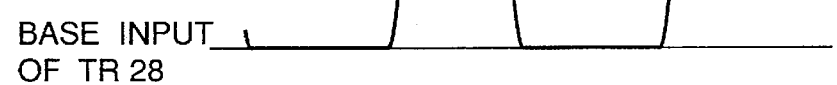
Figure 3D:
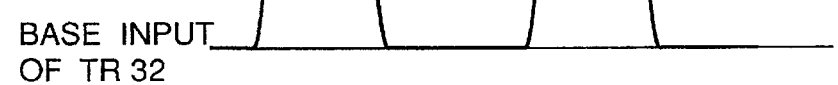

The output of transistor 38 of the one transistor pair 38 and 39 passes transistors 28 and 29 of the three transistors 28, 29, and 30 forming a first current mirror circuit; and the output of transistor 43 of the other transistor pair 42 and 43 passes transistors 32 and 33 of the three transistors 31, 32, and 33 forming a second current mirror circuit. The output of the second current mirror circuit is introduced to the output circuit 6 through the pre-drive circuit 5 as described below. The output of transistor 38 which is applied to the base of transistor 28 is shown in FIG. 3C. The output of transistor 43 which is applied to the base of transistor 32 is shown in FIG. 3D. As understood from the above, the signal shown in FIG. 3C is based on the signal shown in FIG. 3B which is in turn based on the signal shown in FIG. 3A. The signals which the signal of FIG. 3D is based on are not shown, but are understood as similar to the signals shown in FIGS. 3A and 3B, but in opposite phase.

Figure 3E:
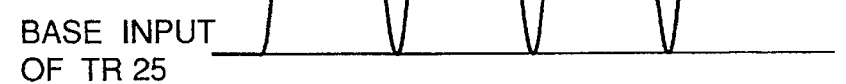

The collectors of transistors 30 and 31 are connected together, and in turn connected to resistor 27 and also to the base of transistor 25. The outputs from the collectors of transistors 30 and 31, which are the positive half cycle signals in opposite phase, are combined, and the combined signal is used as a feedback signal, which is applied to the base of transistor 25. The combined signal is shown in FIG. 3E.

The AGC (automatic gain control) circuit 4 comprises transistors 24 and 25 forming differential amplifier; transistors 22 and 23 forming a current mirror circuit; control transistor 14 for controlling the magnetic detection circuit 1; integrating capacitor 13; and a resistor 27 for converting the current output o transistors 30 and 31 to a voltage signal. The AGC circuit 4 controls the variation in the output of the magnetic detection circuit 1 which results from variations in the output sensitivity of the magnetic detection element 11.

Figure 3F:
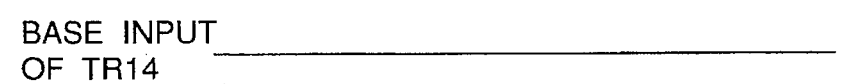

The feedback signal which as the combined signal is applied to the base of transistor 25 and a reference voltage FE from a constant voltage source 60 is applied to the base of transistor 24. Thus, the combined signal and the reference signal FE are compared, and the collector current of transistor 25 is integrated in capacitor 13. The signal at the base of transistor 14 would be as shown in FIG. 3F, such that the integrated value becomes as nearly equal to the reference voltage FE. The signal at the base of transistor 14 controls the magnetic detection circuit 1 to be at a predetermined level.

The pre-drive circuit 5 comprises transistors 47, 48, and 49, 50 forming current mirror circuits. The collectors of transistors 47 and 49 are connected to the collectors of transistors 33 and 29, and the collectors of transistors 48 and 50 are connected to Vcc.

The output circuit 6 is for actually driving the motor drive coils 55a, 55b, 56a and 56b, and comprises transistors 51, 52 and 53, 54 forming current mirror circuits. The collectors of transistors 51 and 53 are respectively connected to the common emitters of transistor pairs 47, 48 and 49, 50. The collector of transistor 52 is connected to Vcc through motor drive coils 55a and 55b, and the collector of transistor 54 is connected to Vcc through motor drive coils 56a and 56b. From the collector of transistor 54, a signal similar to that shown in FIG. 3C is produced, and from the collector Of transistor 52, a signal similar to that shown in FIG. 3D is produced. By the alternately generated magnetic field using coils 55a, 55b, 56a and 56b, the rotor 57 rotates at a speed determined by the alternating cycle of the generated magnetic field.

Also shown are constant current sources 21, 26, and 46. The dot-dash line indicates the integrated circuit 7, but it should be noted that the magnetic detection circuit 1 may also be integrated with the integrated circuit 7.

Figure 2:
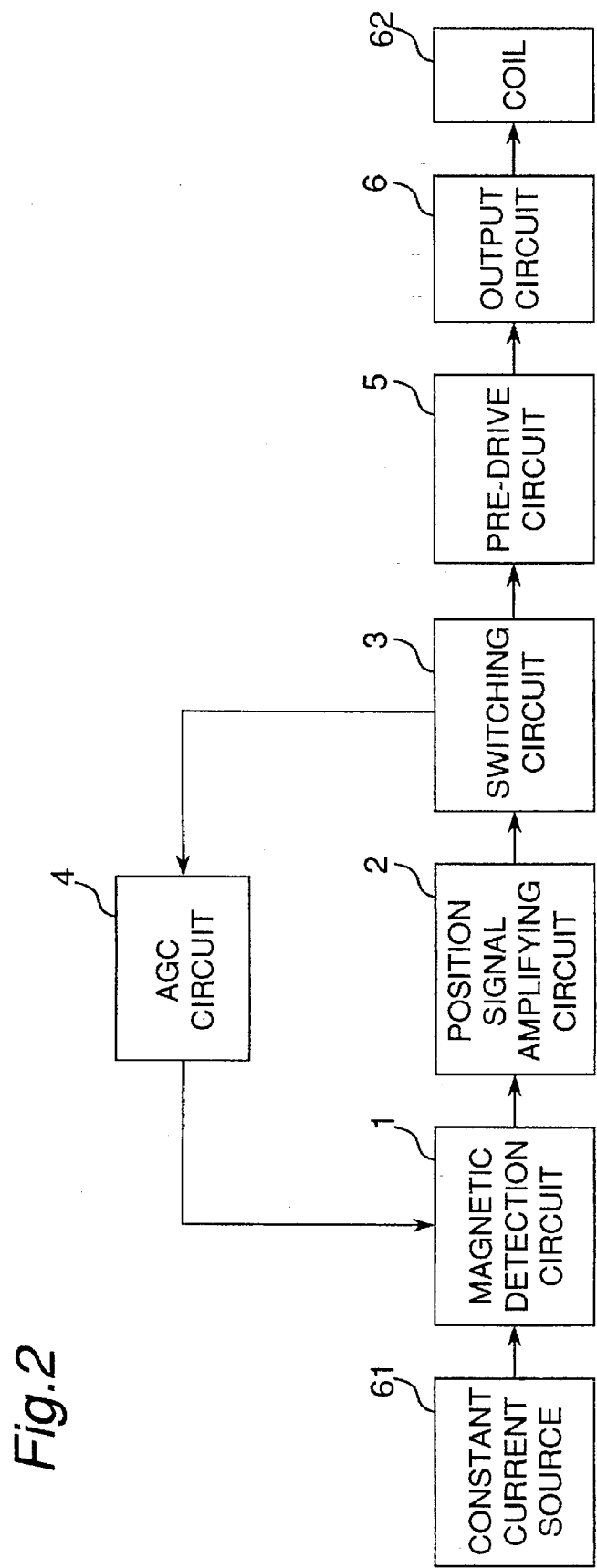
FIG. 2 is a block diagram of the schematic in FIG. 1 used for description.

FIG. 2 is a block diagram of the circuit units 1–6 in FIG. 1. Also shown are the rated current supplies 21, 26, and 46 as constant current source 61; and motor drive coils 55 and 56 as coil 62.

The operation of the invention thus comprised is described below.

To prevent generation of an induction voltage during phase switching with two-phase, half-wave drive, the current is increased and a switching pulse determined by the rate of change to the current time is produced. To suppress this switching pulse, it is necessary to balance the size of the current and the slope of current change. Sine wave drive can be used to suppress the slope of current change during phase switching, but when a differential amplifier of simple construction is used for the switching circuit, the signal levels during phase switching are equal, the current I supplied from the rated current supply flows one-half at a time to the output circuit, and both phases become ON.

To improve this, the present inventors provided a cancellation circuit, continuously supply ½ current to the collector of the separating transistor, and stop the current flow to the output during switching as described in Japanese patent application 1991-7136. In Utility Model Application 1992-56682, the differential amplifiers of the switching circuit are parallel. In both cases, however, it is difficult to state that the output signal is sufficiently stabilized relative to transistor hFE and other variations because part of the output signal is returned as negative feedback only.

In the present invention, the output signal from the differential amplifier of the switching circuit is monitored by the current mirror circuit, compared with a reference voltage, and used to control the Hall generator or other magnetic detection circuit. In other words, in FIG. 1, the bases of transistors 38, 39 and 42, 43 are connected in common; and the collectors of transistors 38 and 43 are connected to output circuit 6 through transistors 28, 29 and 32, 33 of the transistors 28, 29, 30 and 31, 32, 33 forming current mirror circuits. The collectors of transistors 39 and 42 are also connected to the collectors of transistors 43 and 38 through transistors 34, 35 and 36, 37 forming current mirror circuits, thus functioning to cancel the current flowing to the output.

As a result, each phase of the current flowing from the switching circuit 3 ranges from 0–½. The collector currents of transistors 30 and 31 in the transistors 28, 29, 30 and 31, 32, 33 forming current mirror circuits completely monitor the output current. A completely closed loop is thus formed if these collector currents are therefore combined, converted to a voltage signal by means of resistor 27, and compared with the reference voltage FE by means of the AGC circuit 4 to control the magnetic detection circuit 1; the output signal is thus univocally determined by the reference voltage FE.

Therefore, if the reference voltage FE is stabilized by the constant voltage source, a stable output signal can be obtained.

Figure 4:
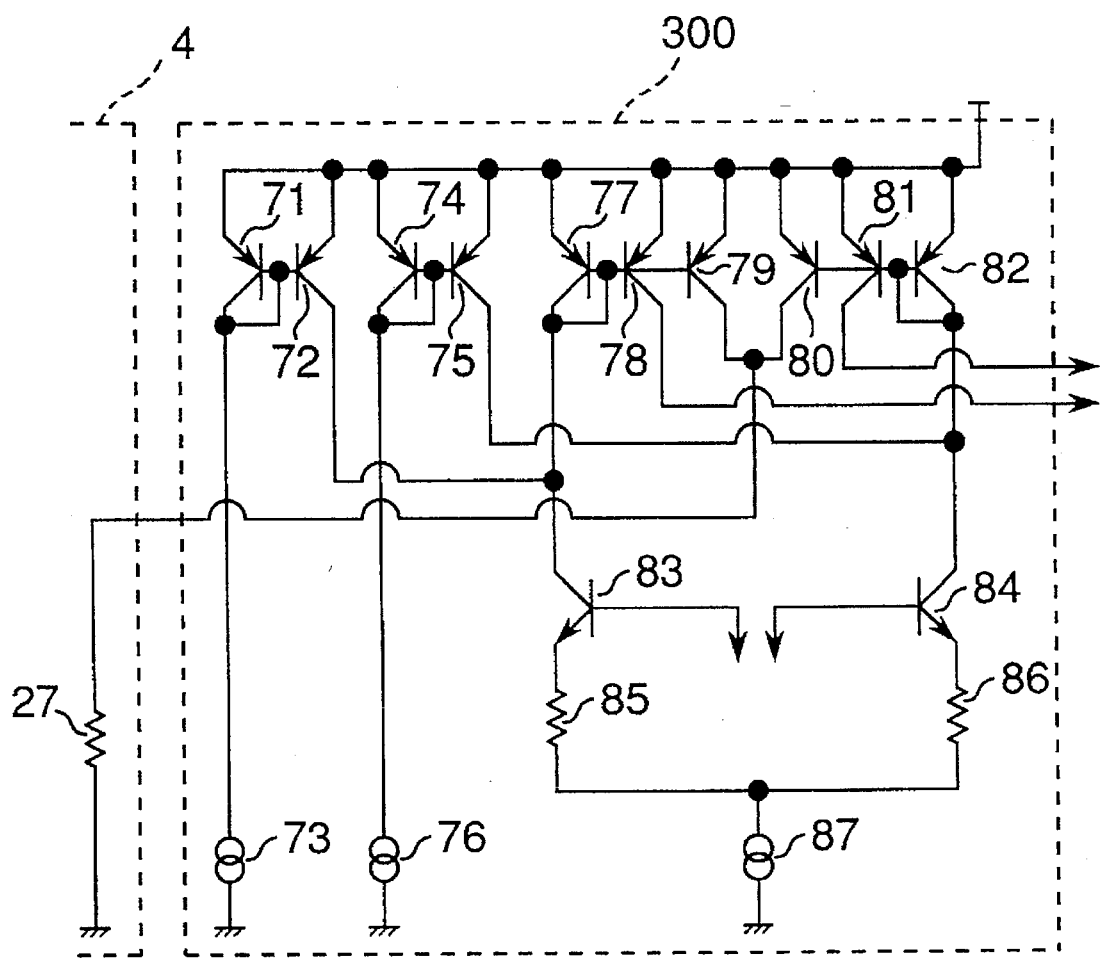
FIG. 4 is a schematic diagram of a brushless motor drive circuit according to the second embodiment of the invention.

FIG. 4 is a schematic diagram of a brushless motor drive circuit according to the second embodiment of the invention; switching circuit 300 can be substituted for the switching circuit 3 shown in FIG. 1. More specifically, the collectors of transistors 83 and 84, which form a differential amplifier, are connected to the output circuit through transistors 77, 78 and transistors 81, 82 of the transistors 77, 78, 79, and 80, 81, 82 forming current mirror circuits. When the rated current is supplied from rated current supplies 73 and 76, which are set to ½ the current level of rated current supply 87, to the collectors of transistors 83 and 84 through transistors 71, 72 and 74, 75, which form current mirror circuits, this rated current supply works to cancel the current flowing to the output circuit.

As a result, each phase of the current flowing from the switching circuit 300 ranges from 0–½. The collector currents of transistors 79 and 80 in the transistors 77, 78, 79 and 80, 81, 82 forming current mirror circuits completely monitor the output current. A completely closed loop is thus formed if these collector currents are therefore combined, converted to a voltage signal by means of resistor 27, and compared with the reference voltage FE by means of the AGC circuit 4 to control the magnetic detection circuit 1; the output signal is univocally determined by the reference voltage FE.

Figure 3G:
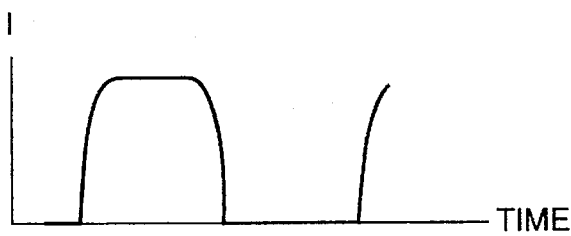
Figure 3H:
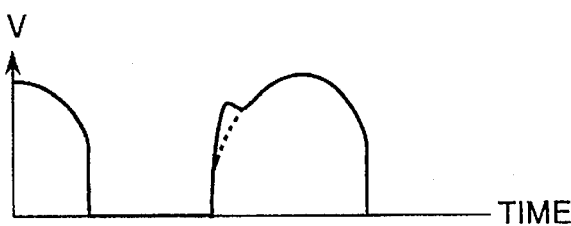

The resulting output current wave is thus as shown in FIG. 3G, the output voltage wave is as shown in FIG. 3H, and the switching pulse is suppressed. In FIG. 3H, a dotted line indicates a virtual induced electromotive force.

Figure 5:
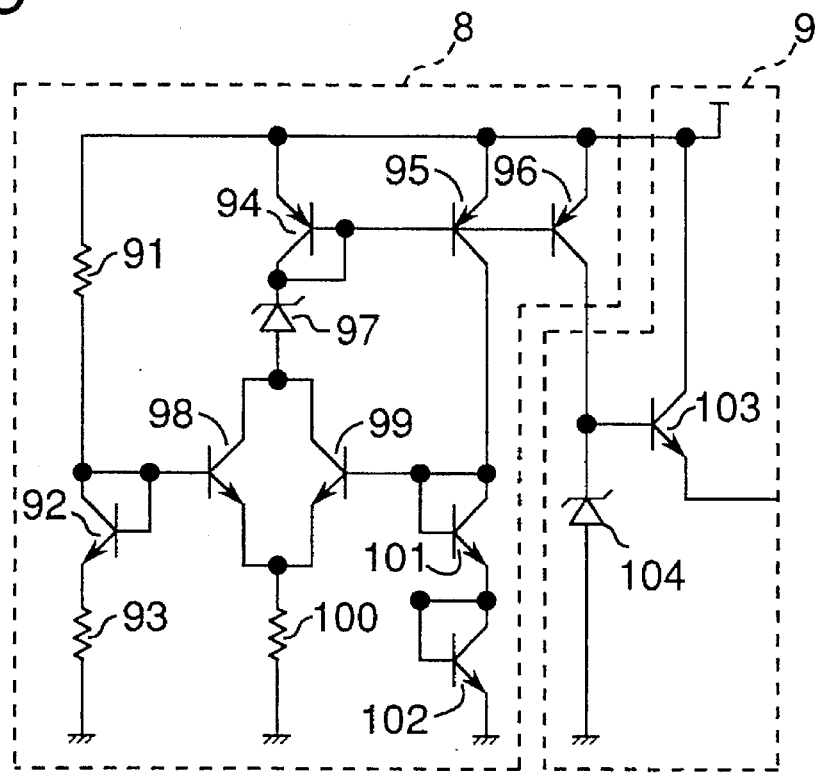
FIG. 5 is a schematic diagram of a constant voltage source in the preferred embodiments of the invention.

An applied example of a constant voltage source used to stabilize the reference voltage is shown in FIG. 5. This constant voltage source comprises a starter circuit 8 and a constant voltage source 9. The starter circuit 8 comprises transistors 98 and 99 with the collectors and emitters thereof connected in parallel; diode-connected transistors 92 and 101, 102, and resistors 91 and 93, 100; Zener diode 97; and transistors 94, 95, and 96 forming a current mirror circuit. The constant voltage source 9 comprises a control transistor 103 and Zener diode 104.

Figure 6:
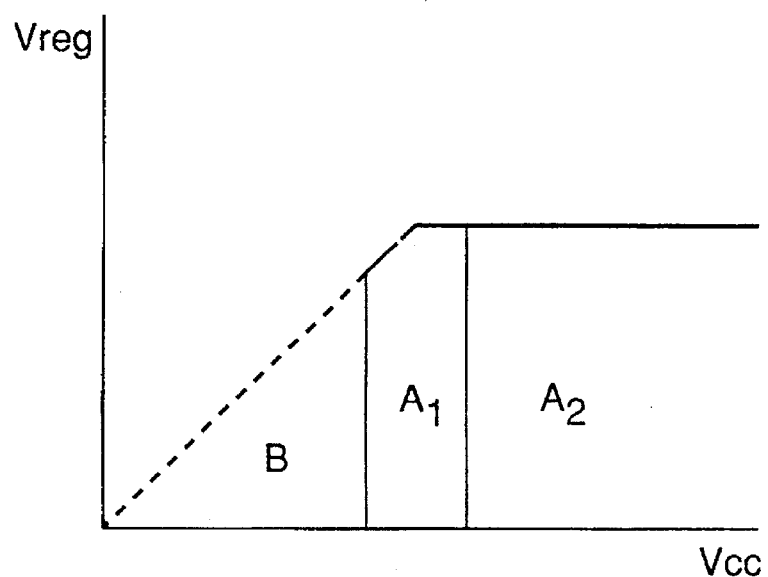
FIG. 6 is a characteristics curve of the circuit shown in FIG. 5.
Figure 7:
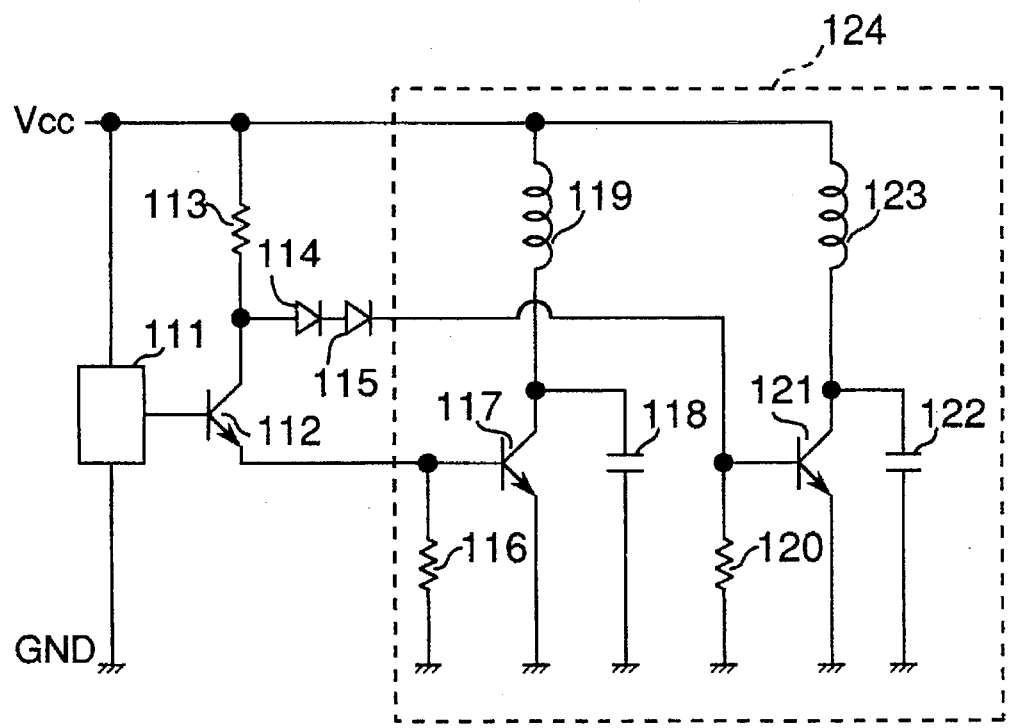
FIG. 7 is a schematic diagram of a brushless motor drive circuit according to the prior art.
Figure 8:
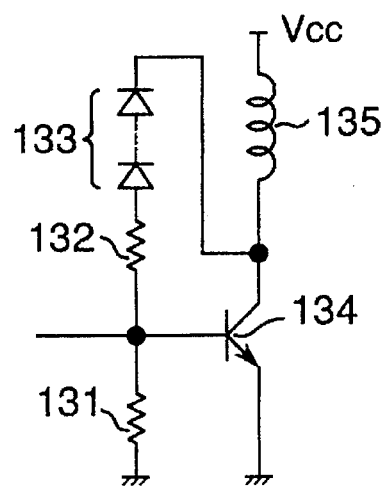
FIG. 8 is a schematic diagram of a brushless motor drive circuit according to another example of the prior art.
Figure 9A:
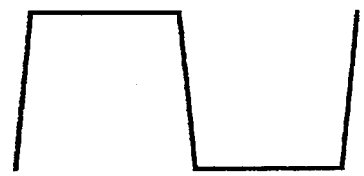
FIGS. 9A, 9B, 9C, and 9D are wave form diagrams of the output voltage wave obtained from the prior art using capacitors as shown in FIG. 7 or Zener diodes as shown in FIG. 8.
Figure 9B:
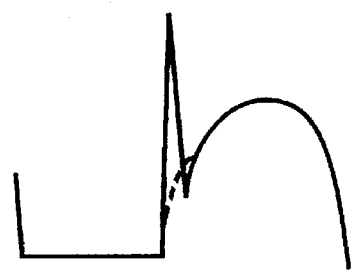
Figure 9C:
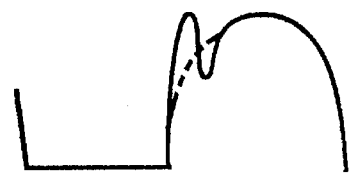
Figure 9D:
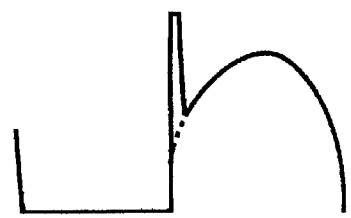

Without the Zener diode 97, this would be a normal constant voltage source with a voltage characteristic as indicated by the dotted line B in FIG. 6; even when the power supply voltage Vcc is low, this constant voltage source would supply an unstable output Vreg. As a result, operation of the entire device is affected, and may be other than expected. If the Zener voltage of the Zener diode 97 is selected within the range A1–A2 in FIG. 6, however, so that the constant voltage source applies a stable output voltage Vreg, this problem can be prevented.

Though not shown in the figures, it is also possible to provide a lock detection circuit for interrupting the current to the motor drive coil when the rotor locks, and regularly generating a restart pulse; and a lock protection circuit to which the output signal of the lock detection circuit is input to interrupt the current flowing to the motor drive coil. It is thereby possible to prevent seizing due to overcurrent in the motor drive coil when the rotor locks, and the switching pulse resulting from the restart pulse can be suppressed.

It is to be noted that the present invention can also be applied with single-phase, full-wave drive methods.

By monitoring and combining the output current separated by the switching circuit, and comparing the output current with a reference voltage by means of an AGC circuit, the present invention can provide a high efficiency, brushless motor drive circuit that can prevent switching pulses during normal operation and even when the rotor locks without providing large external components; is free of switching noise; has minimal reactive current during phase switching; and is suited to circuit integration. The benefits of the invention are therefore great, and include a reduction in the number of parts and the ability to be installed in less space.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brushless motor drive circuit for driving a brushless motor having a rotor comprising:
    a magnetic detection circuit comprising a magnetic detection element for detecting a rotational position of the rotor and for producing a plurality of position signals in different phases;
    a switching circuit for separating said position signals, cutting off one of the positive and negative sides of each of the separated position signals to produce half cycle signals, and combining said half cycle signals to produce a combined signal;
    an automatic gain control circuit for comparing said combined signal with a predetermined reference signal, and feeding back the compared signal to said magnetic detection circuit;
    a pre-drive circuit for transmitting said half cycle signals; and
    an output circuit for producing a drive signal for driving the motor responsive to said half cycle signals from said switching circuit.

2. A brushless motor drive circuit comprising:
    a magnetic detection circuit comprising a magnetic detection element for detecting a rotational position of a rotor;
    a position signal amplifying circuit for amplifying an output of the magnetic detection circuit;
    a switching circuit for separating an output signal of the position signal amplifying circuit into two signals corresponding to opposite phases of said output signal and for combining said two signals;
    an automatic gain control circuit for comparing said combined two signals with a reference voltage and for controlling a variation in the output of the magnetic detection circuit resulting from variations in an output sensitivity of the magnetic detection element;
    a pre-drive circuit for output amplification of the two signals generated by the switching circuit; and
    an output circuit for driving a motor drive coil by means of the pre-drive circuit output.

3. A brushless motor drive circuit according to claim 2, further comprising an integrating circuit for integrating the output current separated by the switching circuit, wherein the integrated current is compared with the reference voltage of the automatic gain control circuit.

4. A brushless motor drive circuit according to claim 2, wherein said switching circuit comprises first and second pairs of transistors, an output of one transistor of the first pair of transistors being fed back through a current mirror circuit to an output of one transistor in the second pair of transistors.

5. A brushless motor drive circuit comprising:
    a magnetic detection circuit comprising a magnetic detection element for detecting a rotational position of a rotor;
    a position signal amplifying circuit for amplifying an output of the magnetic detection circuit;
    a switching circuit for separating an output signal of the position signal amplifying circuit into two signals corresponding to opposite phases of said output signal and for combining said two signals;
    an automatic gain control circuit for comparing said combined two signals with a reference voltage and for controlling a variation in the output of the magnetic detection circuit resulting from variations in an output sensitivity of the magnetic detection element;
    a cancellation circuit for introducing a current one-half of a switching circuit operating current to cancel the output of the switching circuit;
    a pre-drive circuit for output amplification of the two signals generated by the switching circuit; and
    an output circuit for driving a motor drive coil by means of the pre-drive circuit output.

6. A brushless motor drive circuit according to claim 5, further comprising an integrating circuit for integrating the output current separated by the switching circuit, wherein the integrated current is compared with the reference voltage of the automatic gain control circuit.

7. A brushless motor drive circuit comprising:
    a constant voltage source comprising a starter circuit for stabilizing a reference voltage;
    a magnetic detection circuit comprising a magnetic detection element for detecting a rotational position of a rotor;
    a position signal amplifying circuit for amplifying an output of the magnetic detection circuit;
    a switching circuit for separating an output signal of the position signal amplifying circuit into two signals corresponding to opposite phases of said output signal and for combining said two signals;
    an automatic gain control circuit for comparing said combined two signals with a reference voltage and for controlling a variation in the output of the magnetic detection circuit resulting from variations in an output sensitivity of the magnetic detection element;
    a pre-drive circuit for output amplification of the two signals generated by the switching circuit; and
    an output circuit for driving a motor drive coil by means of the pre-drive circuit output.

8. A brushless motor drive circuit according to claim 7, wherein said starter circuit comprises a Zener diode for starting from a predetermined voltage.

9. A brushless motor drive circuit according to claim 7, further comprising an integrating circuit for integrating the output current separated by the switching circuit, wherein the integrated current is compared with the reference voltage of the automatic gain control circuit.

10. A brushless motor drive circuit according to claim 7, wherein said switching circuit comprises first and second pairs of transistors, an output of one transistor of the first pair of transistors being fed back through a current mirror circuit to an output of one transistor in the second pair of transistors.

11. A brushless motor drive circuit comprising:
    a constant voltage source comprising a starter circuit for stabilizing a reference voltage;
    a magnetic detection circuit comprising a magnetic detection element for detecting a rotational position of a rotor;

a position signal amplifying circuit for amplifying an output of the magnetic detection circuit;

a switching circuit for separating an output signal of the position signal amplifying circuit into two signals corresponding to opposite phases of said output signal and for combining said two signals;

an automatic gain control circuit for comparing said combined two signals with a reference voltage and for controlling a variation in the output of the magnetic detection circuit resulting from variations in an output sensitivity of the magnetic detection element;

a cancellation circuit for introducing a current one-half of the switching circuit operating current to cancel the output of the switching circuit;

a pre-drive circuit for output amplification of the two signals generated by the switching circuit; and an output circuit for driving a motor drive coil by means of the pre-drive circuit output.

12. A brushless motor drive circuit according to claim 11, wherein said starter circuit comprises a Zener diode for starting from a predetermined voltage.

13. A brushless motor drive circuit according to claim 11, further comprising an integrating circuit for integrating the output current separated by the switching circuit, wherein the integrated current is compared with the reference voltage of the automatic gain control circuit.

* * * * *